(12) United States Patent
Schwarz

(10) Patent No.: US 8,587,791 B2
(45) Date of Patent: Nov. 19, 2013

(54) DEVICE AND METHOD FOR VEHICLE MEASUREMENT

(75) Inventor: Andreas Schwarz, Dachau (DE)

(73) Assignee: Robert Bosch GmbH, Stuttgart (DE)

( * ) Notice: Subject to any disclaimer, the term of this patent is extended or adjusted under 35 U.S.C. 154(b) by 121 days.

(21) Appl. No.: 13/230,424

(22) Filed: Sep. 12, 2011

(65) Prior Publication Data

US 2012/0062906 A1  Mar. 15, 2012

(30) Foreign Application Priority Data

Sep. 13, 2010 (DE) .......................... 10 2010 040 639

(51) Int. Cl.
*G01B 11/14* (2006.01)
(52) U.S. Cl.
USPC ........................................ 356/620; 356/614
(58) Field of Classification Search
USPC .................... 356/614, 620, 625, 139.09, 155; 33/288, 203.18, 203.15
See application file for complete search history.

(56) References Cited

U.S. PATENT DOCUMENTS

| | | | | |
|---|---|---|---|---|
| 5,075,772 A | * | 12/1991 | Gebel | 348/135 |
| 5,675,408 A | * | 10/1997 | Samuelsson et al. | 356/155 |
| 5,797,190 A | * | 8/1998 | Matson | 33/203.18 |
| 5,930,881 A | * | 8/1999 | Naruse et al. | 29/407.08 |
| 6,043,875 A | * | 3/2000 | Samuelsson | 356/139.09 |
| 7,121,011 B2 | * | 10/2006 | Murray et al. | 33/288 |
| 7,382,913 B2 | * | 6/2008 | Dorranc et al. | 382/151 |
| 2009/0094845 A1 | * | 4/2009 | Samuelsson | 33/288 |

FOREIGN PATENT DOCUMENTS

DE   4212426 C1 * 7/1993
JP   2008102063 A * 5/2008

* cited by examiner

*Primary Examiner* — Sang Nguyen
(74) *Attorney, Agent, or Firm* — Kenyon & Kenyon LLP

(57) ABSTRACT

A marker device is described for vehicle measurement and has at least one mark that is optically detectable by a measurement camera, and it also has at least one level gauge connected to the mark. The level gauge is configured so that it enables a determination of the spatial orientation of the mark.

6 Claims, 2 Drawing Sheets

DEVICE AND METHOD FOR VEHICLE MEASUREMENT

RELATED APPLICATION INFORMATION

The present application claims priority to and the benefit of German patent application no. 10 2010 040 639.2, which was filed in Germany on Sep. 13, 2010, the disclosure of which is incorporated herein by reference.

FIELD OF THE INVENTION

The present invention relates to a device and a method for vehicle measurement.

BACKGROUND INFORMATION

In the prior art, measurement devices for vehicle measurement, in particular 3-D axial measurement devices, are known in which at least one measurement camera, having a direction of view parallel to the longitudinal extension of the vehicle to be measured, is oriented laterally along the vehicle. In order to be able to measure the vehicle and, for example, determine its level, an optically detectable mark is standardly attached to the body of the vehicle, e.g. to a fender. The mark is oriented in such a way that it is situated in the field of view of a measurement camera. For this purpose, the mark must in particular be oriented at a suitable angle. Because as a rule the mark is situated at a distance from the edge of the fender that is to be measured, both in the vehicle transverse direction and in its height, measurement errors occur.

SUMMARY OF THE INVENTION

An object of the exemplary embodiments and/or exemplary methods of the present invention is to provide an improved (marker) device and a method for vehicle measurement that make it possible to minimize the errors, resulting from the distance between the mark and the vehicle, that occur during such measurements.

A marker device according to the exemplary embodiments and/or exemplary methods of the present invention for use in vehicle measurement has at least one mark that is optically detectable by a measurement camera and at least one level gauge connected mechanically to the mark and having the function of a spirit level. The mark and the level gauge are fashioned and oriented so as to make it possible for the level gauge to determine the orientation of the mark in three-dimensional space.

A method according to the exemplary embodiments and/or exemplary methods of the present invention for measuring a body, in particular a body of a motor vehicle, includes the step of attaching at least one marker device, which has a mark and at least one level gauge, to the body that is to be measured. In a second step, the mark is oriented in a desired defined position with the aid of the level gauge connected to the mark, before a suitable measurement camera is used to take at least one image containing the mark. The spatial position of the optically detected mark is determined from the image taken by the measurement camera, and the data of the geometry of the body of the vehicle are determined, using known methods, from the spatial position of the mark, which has been determined from the image that was taken, and the known orientation of the mark in space, in particular relative to the body.

Using the level gauge connected to the mark, it is possible, before taking the images, to orient the mark in a defined spatial orientation, in particular in a defined spatial orientation relative to the body of the vehicle. Due to the fact that the spatial orientation of the mark is known before the measurement, the spatial orientation of the mark can be taken into account when evaluating the recorded images and when determining the data of the body geometry. In this way, errors resulting from the fact that the position of the mark differs from the position of a point on the body that is to be measured, such as e.g. the edge of a fender, can be minimized or eliminated.

In a specific embodiment, a marker device according to the present invention has at least one fastening device that makes it possible to fasten the marker device on the body of the vehicle to be measured.

Using such a fastening device, the marker device can be fastened and fixed in a defined position on the body in a particularly effective and reliable manner. Measurement errors that could result from a change in the position of the mark during the measurement process are reliably prevented in this way.

In a specific embodiment, the fastening device has an adhesive pad, a magnet, or a suction cup for fastening the fastening device to the body. An adhesive pad, a magnet, and a suction cup provide reliable, easy to operate fastening devices that make it possible to fasten the marker device to the body securely and so as to be easily removed, without damaging the body.

In a specific embodiment, the marker device has at least one joint that makes it possible to change the position of the mark relative to the fastening device. Such a joint makes it possible to orient the mark in a desired position independently of the spatial orientation of the fastening device, and to minimize measurement errors. In this way, the mark can always be oriented in the desired spatial orientation. The mark can in particular be oriented as desired even when a secure fastening of the fastening device to the body requires a predetermined spatial orientation of the fastening device.

In a specific embodiment, the mark is made so as to be light-reflective. A light-reflective mark is particularly effectively optically detectable by a measurement device, in particular a measurement camera, even under weak illumination. In this way, the measurements can be reliably carried out even under weak illumination, and measurement errors resulting from poor recognition of the mark by the measurement device can be avoided. Because the measurements can be carried out even under weak illumination, the cost of an expensive bright illumination device for the measurement station can be saved.

In a specific embodiment of a method according to the present invention for body measurement, the marker device is fastened fixedly to the body, e.g. by gluing. In this way, it is possible to continuously monitor body data such as level. In addition, it is possible, based on the level, to continuously adapt dependent parameters, such as for example camber, that stand in a direct relationship with the level. Fixedly fastening the marker device on the body reliably prevents the position of the measurement device from changing during the continuous monitoring, and from thereby falsifying the measurement results.

In an alternative specific embodiment of a method according to the present invention, the marker device is fastened to the body only briefly, and the level is determined by measurement. The determined value is stored without carrying out further measurements or calculations. Such a method can be carried out particularly quickly, because the time required for secure fastening and later removal of the marker device can be saved. Because no further measurements or calculations are carried out, falsification of the measurement results due to a change of the position of the marker device is excluded even without long-term fixing of the measurement device on the body.

In a specific embodiment of a method according to the present invention, a measurement camera is situated in such a way that its direction of view is oriented essentially parallel to the longitudinal axis of the body to be measured. A method carried out using a camera oriented in this way enables a particularly precise determination of the geometry of the body, because measurement errors resulting from a laterally shifted or oblique direction of view of the camera onto the body are largely prevented.

In a specific embodiment, a method according to the present invention includes a level measurement. Such a method makes it possible to carry out the measurement of the level particularly easily and reliably, with high precision.

In the following, the exemplary embodiments and/or exemplary methods of the present invention are explained in more detail on the basis of the accompanying Figures.

DETAILED DESCRIPTION

Figure 1:
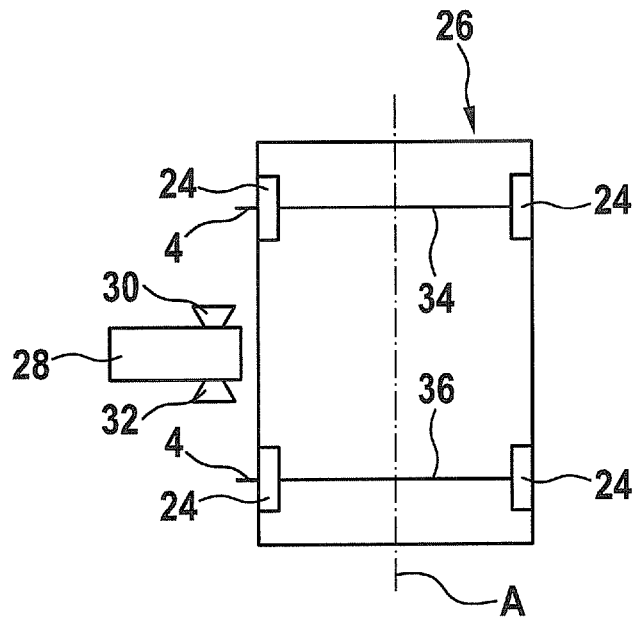
FIG. 1 shows a schematic top view of a measurement station for vehicle measurement.

FIG. 1 shows a schematic top view of a measurement station where a method according to the present invention for vehicle measurement using a marker device according to the present invention can be carried out.

A vehicle to be measured is situated in the measurement station. In FIG. 1, body 26 of the vehicle to be measured is shown schematically. In addition, a front axle 34 and rear axle 36 of the vehicle are shown schematically. A wheel 24 is attached at each of the two ends of front axle 34 and of rear axle 36.

A respective mark 4 is attached on the left side of vehicle 26 above each of the two left wheels 24 attached to front axle 34 and to rear axle 36. Marks 4 are for example each attached to a fender (not shown in FIG. 1), and extend outward (to the left), going out from the left side of body 26 above the respective wheel 24.

On the left side of the vehicle that is to be measured, a measurement head 28 is situated next to body 26. Measurement head 28 has two measurement cameras 30, 32. Measurement cameras 30, 32 are situated such that their directions of view are oriented along the left side of body 26, parallel to a longitudinal axis A of body 26. The direction of view of measurement camera 30 is oriented toward the front, and the direction of view of second measurement camera 32 is oriented toward the rear, so that measurement cameras 30, 32 each optically detect one of the marks 4 that extend outward (to the left) from body 24 and are attached to body 26 above wheels 24.

In the Figures, the system of marks 4 and measurement head 28, together with measurement cameras 30, 32, is shown as an example for the left side of vehicle body 26. For someone skilled in the art, it will be clear that marks 4 can be attached precisely above wheels 24 on the right side of body 26, so that marks 4 will extend outward to the right, going out from body 24. In this case, measurement head 28 will be situated on the right side of body 24 in such a way that the two measurement cameras 30, 32 of measurement head 28 optically detect marks 4, which extend outward going out from the right side of body 24.

In order to measure the geometry of body 26, measurement cameras 30, 32 each take at least one image containing one of the marks 4. The spatial position of each of the optically detected marks 4 is determined from the images taken by measurement cameras 30, 32, and the data of the geometry of body 26 of the vehicle is determined, using known methods, from the spatial position of marks 4, which has been determined from the recorded images, and from the known orientation of marks 4 in space, using known methods of chassis measurement.

In order to enable a precise measurement of the geometry of body 26 using the measurement design shown in the Figure, and to keep the measurement errors that occur during this measurement as low as possible, or to eliminate them, it is necessary for the position of marks 4 relative to body 26 to be known as precisely as possible and to be taken into account in the evaluation of the measurement results.

Figure 2:
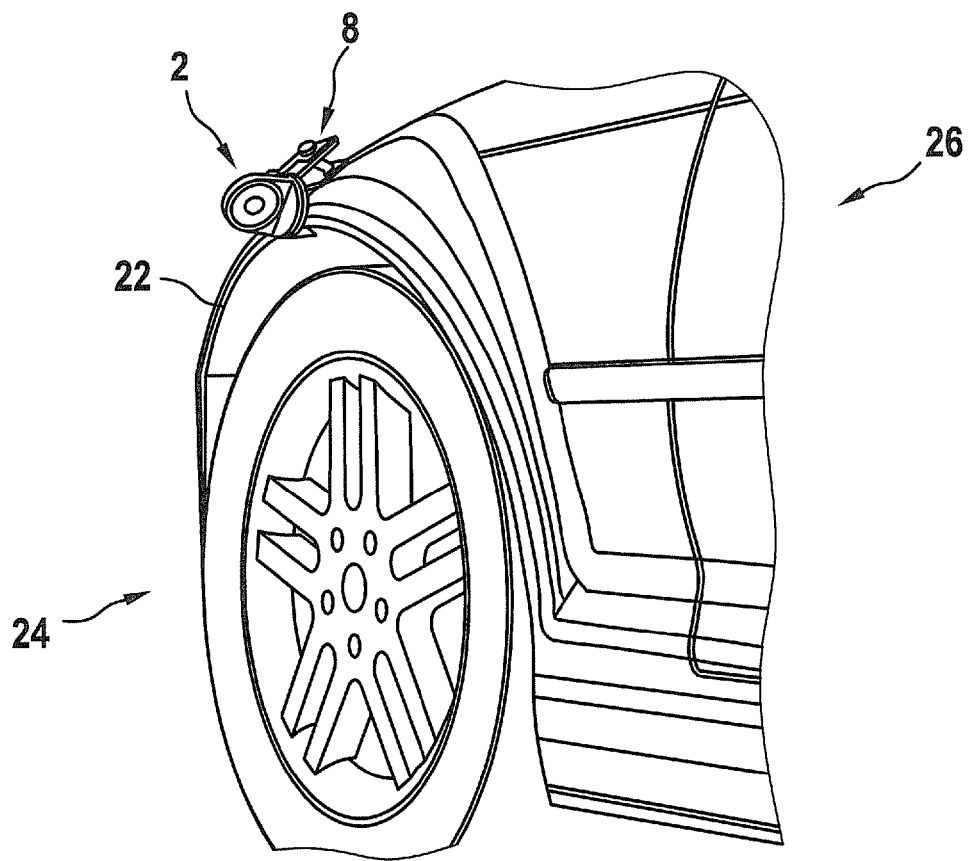
FIG. 2 shows a perspective side view of a vehicle body having a marker device according to the present invention.
Figure 3:
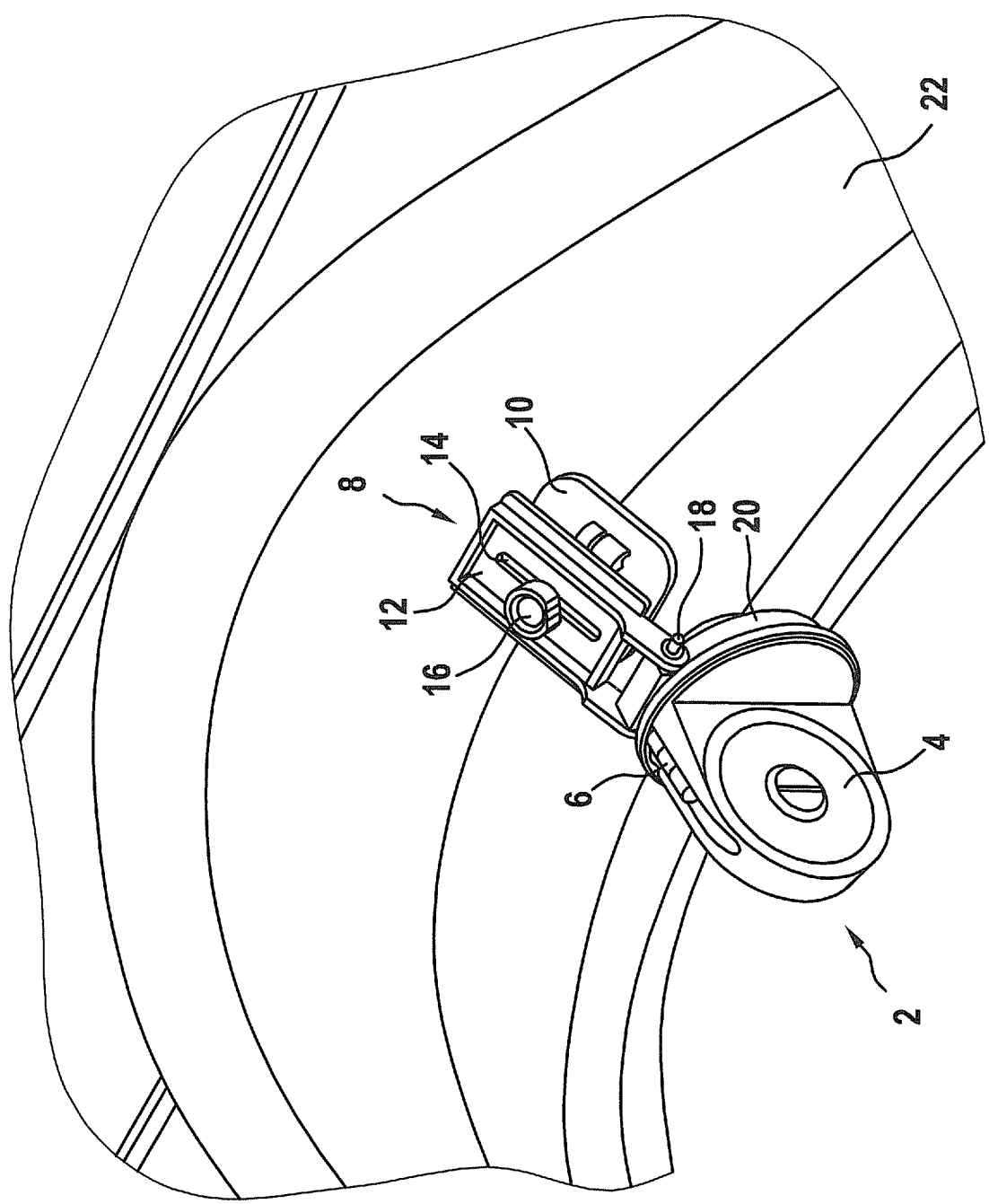
FIG. 3 shows an enlarged representation of a marker device according to the present invention.

The exemplary embodiment of the present invention shown in FIGS. 2 and 3 makes it possible to orient marks 4 precisely in a defined position in space, using a level gauge used as a spirit level.

FIG. 2 shows a perspective side view of a front area of the left side of vehicle body 26, with a wheel 24 and a front left fender 22 that at least partly surrounds wheel 24.

An exemplary embodiment of a marker device 2 according to the present invention has a fastening device 8. Using fastening device 8, marker device 2 is fastened to an area of fender 22 above wheel 24 in such a way that a part of marker device 2 above wheel 24 extends outward from fender 22, away from body 26.

In the following, the design of a marker device 2 according to the present invention is described in detail on the basis of an enlarged representation as shown in FIG. 3.

A marker device 2 according to the present invention has a fastening device 8 that is provided and is suitable to fasten marker device 2 to body 26 of a vehicle.

In the exemplary embodiment shown in FIG. 3, fastening device 8 has an adhesive pad 10 that can be adhesively affixed to body 26. Adhesive pad 10 is fashioned such that it can be removed from body 26 after the measurements have been carried out without damaging body 26, and in particular without damaging the paint applied to body 26.

Using a screw 16, a mounting device 12 is fastened to adhesive pad 10. Screw 16 extends through an oblong hole 14 fashioned in mounting device 12. An end (not visible in FIG. 3) of screw 16 is screwed into a threading (also not visible in FIG. 3) fashioned in adhesive pad 10.

If screw 16 has not been made tight, mounting device 12 can be shifted relative to adhesive pad 10, parallel to the longitudinal extension of oblong hole 14. When a desired position of mounting device 12 relative to adhesive pad 10 has been achieved, the position of mounting device 12 relative to adhesive pad 10 can be fixed by tightening screw 16.

A circular marker mount 20 is pivotably fastened to an (outer) end, facing away from body 26, of mounting device 12, by an axle 18 that is oriented essentially parallel to longitudinal axis A of body 26. A mark 6 that is readily optically detectable by measurement cameras 30, 32 is attached to marker mount 20. In the exemplary embodiment shown in FIGS. 2 and 3, the mark has a central target point and a target circle surrounding the target point. The mark may be made high in contrast, so that it can be readily detected by measurement cameras 30, 32 even under weak illumination.

The position of mark 4 attached to marker mount 20 can be varied by pivoting marker mount 20 about axle 18. The joint formed by mounting device 12, axle 18, and marker mount 20 is fashioned such that it automatically, e.g. by friction and/or locking, holds marker mount 20 and mark 4 in any position once the position has been set.

Marker mount 20 is also fashioned such that mark 4 is additionally rotatable, and remains in a set position, about an axis not shown in the Figure that runs at a right angle through the plane of marker mount 20, parallel to the plane of mark 4. Thus, mark 4 is also rotatable about an axis that is oriented essentially transverse to longitudinal axis A of body 26, in order to enable setting of the desired position of mark 4 in space and relative to body 26.

Using the two described joints, mark 4 can conveniently be set in a desired spatial position, independently of the orientation of fastening device 8.

A level gauge 6, which has the function of a spirit level, is attached to mark 4 in such a way that the spatial orientation of level gauge 6 is fixed relative to mark 4. The orientation of mark 4 relative to the Earth's gravitational field can be read off from level gauge 6, in particular from the position of the air bubble inside level gauge 6. In particular, using level gauge 6 a desired defined orientation of mark 4 in space can be reliably set with a high degree of precision.

In the exemplary embodiments not shown in the Figures, additional level gauges 6 are attached to mark 4 in further spatial orientations. The additional level gauges 6 make it possible to determine and set the spatial orientation of mark 4 relative to further spatial axes.

In particular, a second level gauge can be attached to mark 4 such that its longitudinal axis extends at a right angle to the longitudinal axis of first level gauge 8.

The possibility of orienting the position of mark 4 precisely in space using at least one level gauge 8 makes it possible to take errors resulting from the distance of the position of mark 4 from fender edge 22 into account in the evaluation of the measurements, and to minimize measurement errors resulting from this distance. As a result, after the orientation of mark 4 the measurements can be carried out with a high degree of precision.

Because marker device 2 according to the exemplary embodiments and/or exemplary methods of the present invention has no electronic components and does not require a supply of energy, a marker device according to the exemplary embodiments and/or exemplary methods of the present invention can be produced economically and can be used easily and without requiring maintenance, with a high degree of reliability.

The exemplary embodiments and/or exemplary methods of the present invention can be used in combination with all known optical body measurement systems and methods in which the position of at least one mark attached to the body is detected optically.

What is claimed is:

1. A method for measuring a body, which is a body of a motor vehicle, the method comprising:
   attaching at least one marker device, having a mark and a level gauge, to an area of a fender on the body above a wheel of the motor vehicle;
   orienting the mark using the level gauge;
   optically detecting the mark with a suitable measurement camera;
   determining, by the suitable measurement camera, a spatial position of the detected mark; and
   determining, by the suitable measurement camera, a geometry of the body from the determined spatial position of the mark.

2. The method of claim 1, further comprising gluing an adhesive pad to the fender to fasten the marker device to the body.

3. The method of claim 1, wherein the marker device is attached only briefly to the body.

4. The method of claim 1, wherein the direction of view of the measurement camera is oriented essentially parallel to a longitudinal axis of the body.

5. The method of claim 1, wherein the level gauge provides a level measurement.

6. The method of claim 1, further comprising pivoting the marker device about an axle oriented essentially parallel to a longitudinal axis of the body until the mark is level according to the level gauge.

* * * * *